(12) United States Patent
Pasternak

(10) Patent No.: US 6,990,394 B2
(45) Date of Patent: Jan. 24, 2006

(54) LIGHTING CONTROL SYSTEM AND METHOD

(76) Inventor: Barton A. Pasternak, 7900 Hidden La., Elkins Park, PA (US) 19027

( * ) Notice: Subject to any disclaimer, the term of this patent is extended or adjusted under 35 U.S.C. 154(b) by 9 days.

(21) Appl. No.: 10/460,355

(22) Filed: Jun. 13, 2003

(65) Prior Publication Data

US 2004/0122930 A1 Jun. 24, 2004

Related U.S. Application Data

(60) Provisional application No. 60/436,364, filed on Dec. 24, 2002.

(51) Int. Cl.
*G05D 25/00* (2006.01)
*H04H 1/00* (2006.01)

(52) U.S. Cl. ............. 700/295; 700/20; 700/275; 455/3.01

(58) Field of Classification Search .......... 700/295, 700/296, 12, 20, 275, 292; 455/3.01
See application file for complete search history.

(56) References Cited

U.S. PATENT DOCUMENTS

| | | | |
|---|---|---|---|
| 5,109,222 A | 4/1992 | Welty | 340/825.72 |
| 5,572,438 A | 11/1996 | Ehlers et al. | 700/295 |
| 5,822,012 A | 10/1998 | Jeon et al. | 348/553 |
| 5,880,677 A | 3/1999 | Lestician | 340/3.1 |
| 6,175,860 B1 | 1/2001 | Gaucher | 709/208 |
| 6,405,261 B1 | 6/2002 | Gaucher | 709/250 |
| 6,548,967 B1 * | 4/2003 | Dowling et al. | 315/318 |
| 6,636,005 B2 * | 10/2003 | Wacyk et al. | 315/291 |
| 6,671,586 B2 * | 12/2003 | Davis et al. | 700/295 |
| 6,681,110 B1 * | 1/2004 | Crookham et al. | 455/420 |
| 6,694,125 B2 * | 2/2004 | White et al. | 455/16 |
| 2001/0034754 A1 | 10/2001 | Elwahab et al. | 709/201 |
| 2002/0078198 A1 | 6/2002 | Buchbinder et al. | 709/224 |
| 2002/0198978 A1 | 12/2002 | Watkins | 709/223 |
| 2003/0020595 A1 * | 1/2003 | Wacyk | 340/3.5 |
| 2003/0151909 A1 * | 8/2003 | Sid | 362/85 |
| 2004/0002792 A1 * | 1/2004 | Hoffknecht | 700/295 |

* cited by examiner

*Primary Examiner*—Jayprakash N. Gandhi
(74) *Attorney, Agent, or Firm*—Drinker Biddle & Reath LLP

(57) ABSTRACT

A control system for allowing remote control of a load. The control system includes a command controller for running a control program that provides a command signal. The command controller has a first wireless interface for transmitting the command signal on a first wireless network. A remote controller has a second wireless interface for receiving the command signals from the command controller via the first wireless network. The remote controller includes a controller for adapting the received command signals for communication on a second wireless network. The remote controller has a third wireless interface for transmitting the adapted command signals via a second wireless network to the load.

9 Claims, 5 Drawing Sheets

LIGHTING CONTROL SYSTEM AND METHOD

The present application claims priority from a provisional patent application, Ser. No. 60/436,364, filed Dec. 24, 2002.

FIELD OF THE INVENTION

The present invention relates to remote controls and, in particular, to a method and system for remotely controlling devices and/or remotely monitoring devices and processes and/or remotely collecting data.

BACKGROUND OF THE INVENTION

The process of remotely controlling and monitoring devices and data has generally been a manual and non-remote task. This requires a significant amount of human intervention. For example, after all the employees have left an office building for the day, someone may need to walk through the building to ensure that the lights in each office have been turned off. There have been recent developments of systems for automated control of devices. Such systems typically include a computer located at a remote site that performs the automated control of local devices. Thus, in order to control devices in multiple remote locations, a user must access and control multiple computers at each of the remote locations. There is a need for a system for remotely controlling and/or monitoring remote devices via a common interface.

SUMMARY OF THE INVENTION

In one aspect, the invention comprises a control system for allowing remote control of a load. The control system includes a command controller for running a control program that provides a command signal. The command controller has a first wireless interface for transmitting the command signal on a first wireless network. A remote controller has a second wireless interface for receiving the command signals from the command controller via the first wireless network. The remote controller includes a controller for adapting the received command signals for communication on a second wireless network. The remote controller has a third wireless interface for transmitting the adapted command signals via a second wireless network to the load.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
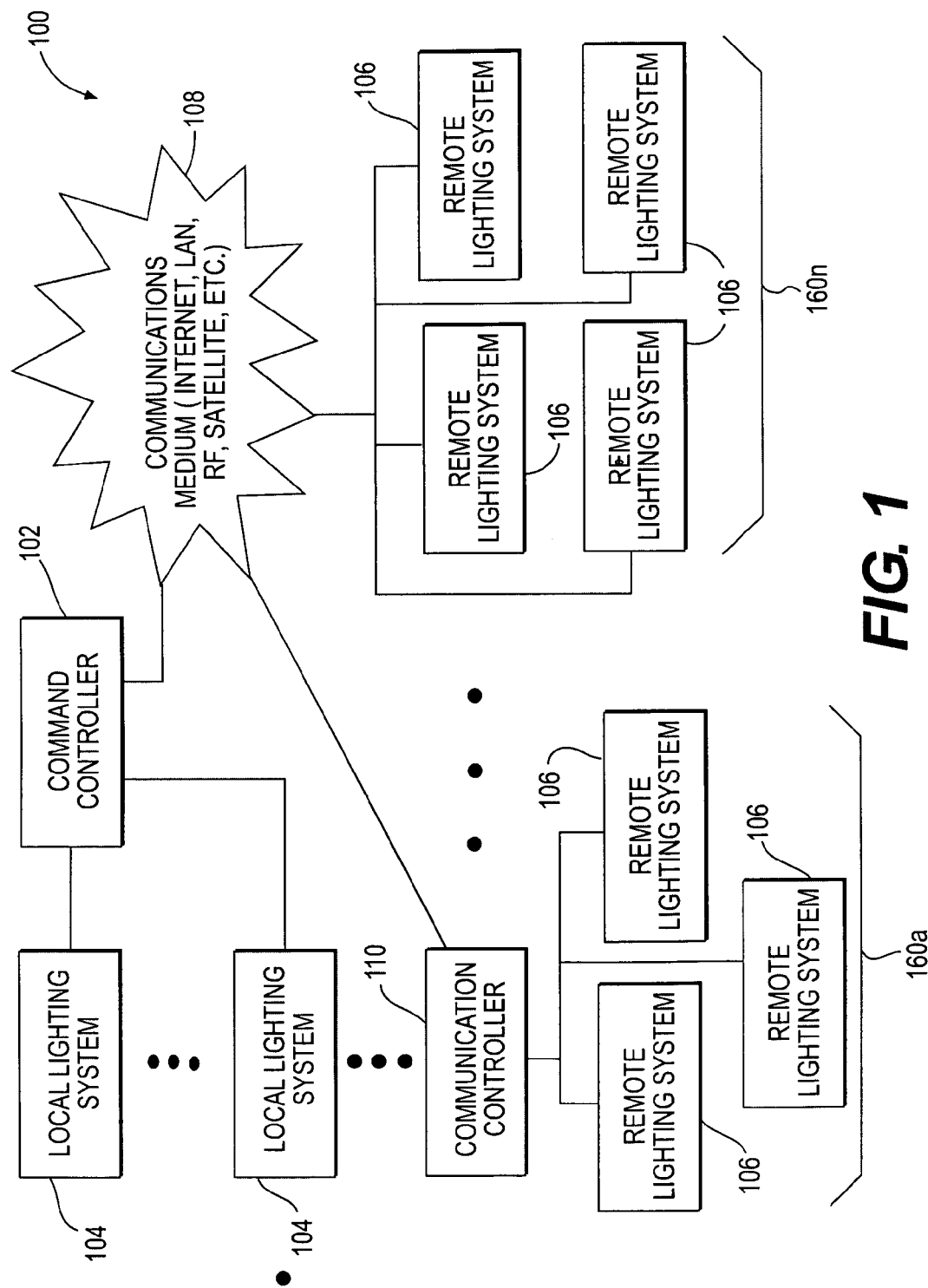
FIG. 1 is a partial block diagram of an exemplary lighting control system according to the present invention.

Referring to the drawings in which like reference numerals indicate like elements, there is shown in FIG. 1 a block diagram of an exemplary lighting control system 100 according to the present invention. The lighting control system 100 includes a command controller 102 to control the operation of one or more local lighting systems 104 and/or one or more geographically remote lighting systems 106.

The command controller 102 bidirectionally communicates with the remote lighting systems 106 via a communications medium 108. The communications medium 108 links the command controller 102 to the remote lighting systems 106 via one or more communication mediums including the Internet, local area networks (LANs), virtual local area networks (VLANs), radio frequency (RF) links, satellite links, optical links, etc. and combinations thereof.

The command controller 102 may communicate with the one or more remote lighting systems 106 in one geographic location 160a via one form of the communications medium 108 while also communicating with remote lighting systems 106 of another different geographic location 160n via a different form of the communications medium 108.

In the case of a satellite link, for example, the lighting control system 100 may include a communication controller 110 as a physical layer interface between the communications medium 108 and the remote lighting systems 106 in a particular geographic location 160a. When the communications medium 108 is the Internet or a LAN, each remote lighting system 106 in a particular geographic location 160n may include its own interface to such communications medium 108 for directly communicating with the command controller 102.

The command controller 102 may directly communicate, such as via direct wired connection, with the local lighting systems 104 which are geographically proximate to the command controller 102. The local lighting systems 104 are equivalent to the remote lighting systems 106 except for differences in their communication interface to the command controller 102.

Figure 2:
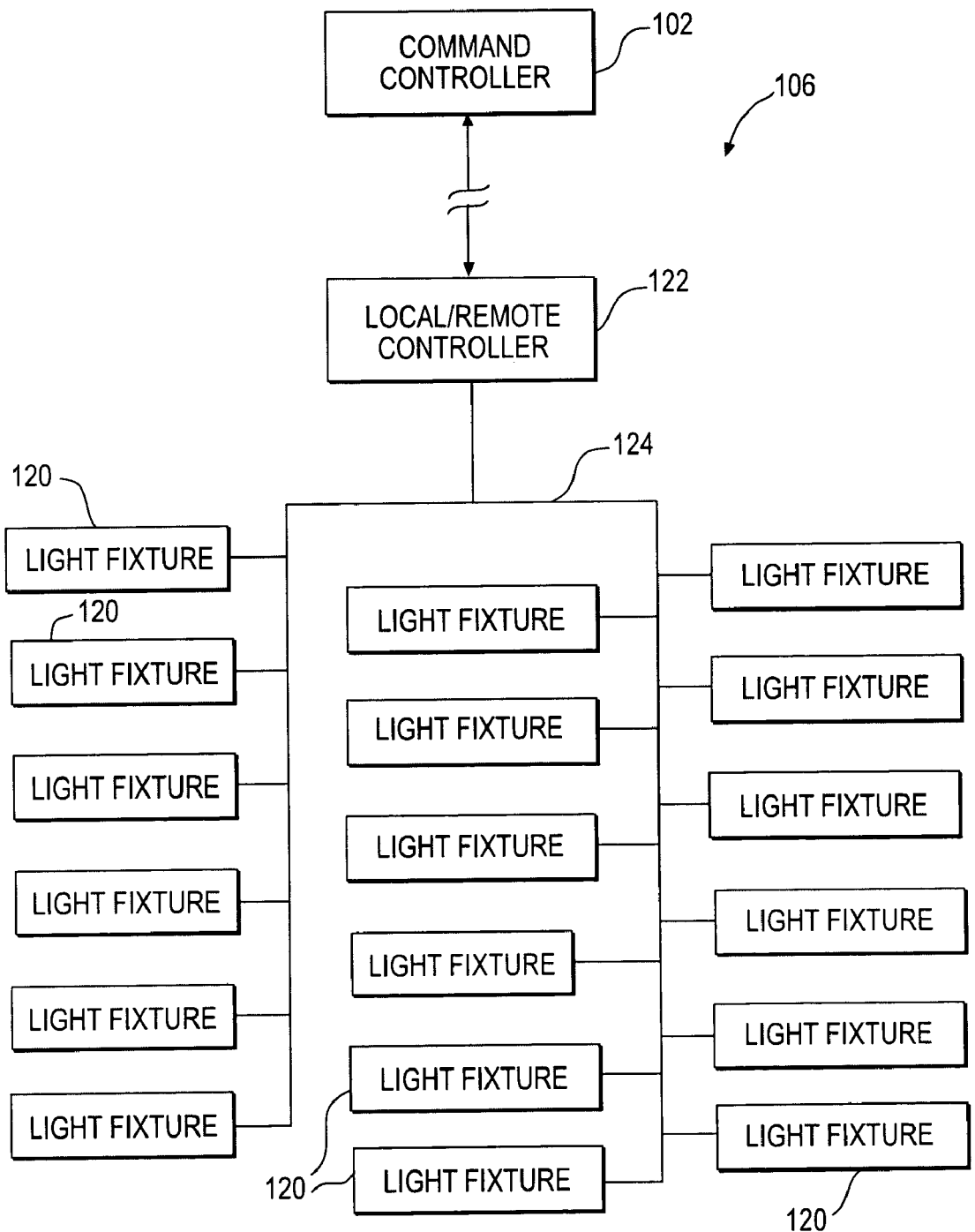
FIG. 2 is a partial block diagram of an exemplary remote lighting system according to the present invention.

A block diagram of an exemplary remote lighting system 106 is shown in FIG. 2. The remote lighting system 106 includes one or more separate and independently addressable light fixtures 120 that may be independently controlled by a local/remote controller 122 via a communication link 124. Although the communication link 124 is illustrated as a network linking all the light fixtures 120, communication between the local/remote controller 122 and the light fixtures 120 may be via wired links (e.g. a building's power grid or a dedicated wired connection), wireless links (e.g. 802.11b links), or a combination thereof. The wired or wireless links to the light fixtures 120 may be direct point-to-point connections or networked connections. As used herein, the term "wired" encompasses optical communication mediums.

Figure 3:
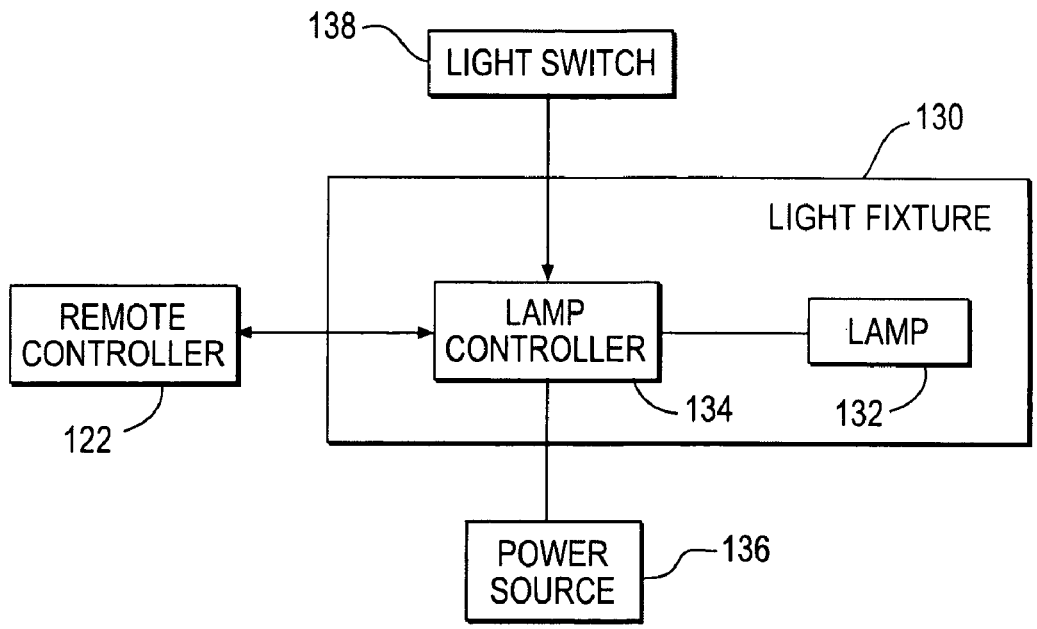
FIGS. 3–4 are partial block diagrams of exemplary light fixtures according to the present invention.

A block diagram of an exemplary light fixture 130 according to the present invention is shown in FIG. 3. The light fixture 130 includes a lamp 132. A lamp controller 134 selectively turns on, turns off, dims, brightens, or flashes the lamp 132. The lamp controller 134 controls such operation of the lamp 132 by selectively coupling a power source 136 to the lamp 134 in response to signals received from a light switch 138 and/or a remote controller 122. In an exemplary embodiment, the lamp controller 134 does not include an interface to a light switch and operation of the lamp 132 is controlled exclusively by the remote controller 122. Although the light fixture 130 is illustrated as including only a single lamp 132, each lamp controller may control one or more lamps 132. Also, where the lamp being controlled is a fluorescent lamp, the control signals are communicated to the ballast that energizes the lamp. In the remainder of this description, it is assumed that those skilled in the art would recognize that a "switch" or "relay" that operates a lamp managed by the controllers in the present invention includes the ballast (including dimming ballasts) that energizes fluorescent lamps.

The lamp controller 134 may be configured to operate the lamp 132 in one of several modes of operation. In a first, dependent mode of operation, the lamp controller 134 controls operation of the lamp 132 only in response to command signals received from the remote controller 122. In the event that a light switch 138 is coupled to the lamp controller 134, when the light switch is actuated, the lamp controller 134 transmits a corresponding signal to the remote controller 122. The remote controller 122 may then selectively signal the lamp controller 134 to operate the lamp in response to actuation of the light switch 138. Alternatively, the light switch may be coupled directly to the remote controller 122 and not to the lamp controller 134.

In a second, independent mode of operation, the lamp controller 134 is configured by the remote controller 122 to control operation of the lamp 132 independent of the remote controller. This way, operation of the lamp 132 is not affected by a loss of communication between the remote controller 122 and the lamp controller 134 or between the remote controller 122 and the command controller 102. In an exemplary embodiment, when the lamp controller 134 detects (e.g. via a timeout) loss of communication with the remote controller 122, it then enters its independent (or default) mode of operation.

In a third, combined mode of operation, the lamp controller 134 is configured to independently operate in response to certain circumstances and to dependently operate in other circumstances. For example, in the combined mode of operation the lamp controller 134 may dependently receive signals to turn the lamp 132 on in the morning and off in the evening but independently override the remote controller 122 to operate to the lamp 132 in response to actuation of the light switch 138. As another example, the lamp controller 134 may be configured via the remote controller 122 to control the lamp 132 in a predetermined manner (based on time of day, actuation of the light switch, etc.) in the event that communication with the remote controller 122 is lost and to otherwise control the lamp 132 in response to signals received from the remote controller 122.

Figure 4:
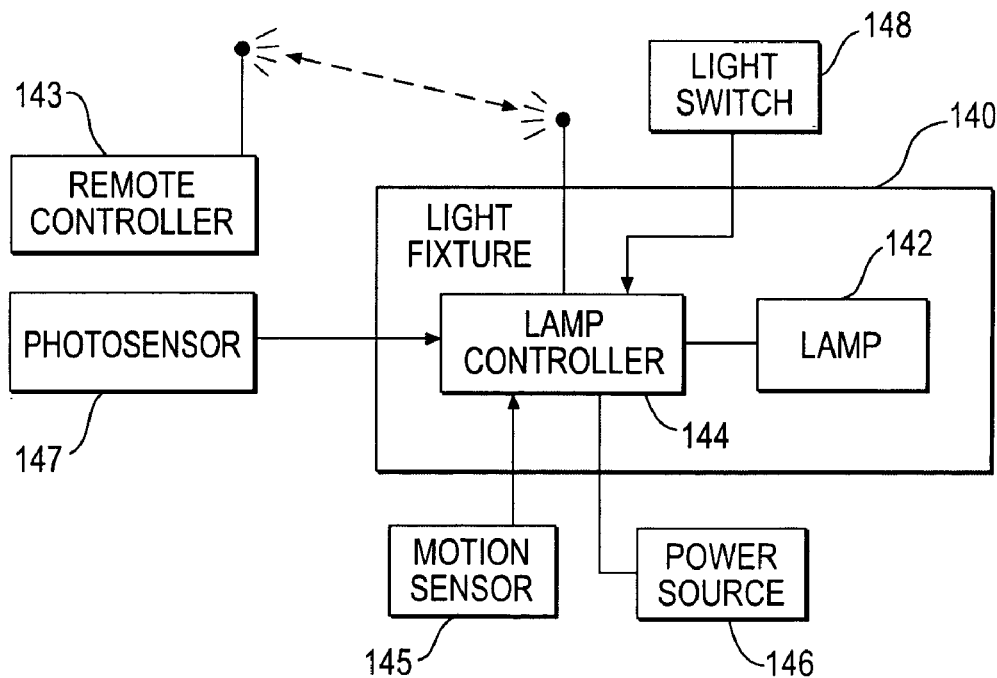

Another exemplary light fixture 140 according to the present invention is shown in FIG. 4. Similar to the light fixture 130 of FIG. 3, the light fixture 140 includes a lamp controller 144 which controls the operation of a lamp 142 by selectively coupling the power source 146 to the lamp 142. The lamp controller 140 of FIG. 4 selectively operates (on/off/dim/brighten/flash) the lamp 142 in response to signals received not only from the remote controller 143 and the light switch 148, but also from a motion sensor 145 and a photo sensor 147. Similar to the light fixture 130 in FIG. 3, the lamp controller 140 may operate in independent, dependent, or combination modes of operation. In addition, the light switch 148, the motion sensor 145, and the photo sensor 147 may be directly coupled to the remote controller 143.

The motion sensor 145 provides a signal to the lamp controller 144 indicating whether there is motion (and possibly characterizing the motion) in the vicinity of the motion sensor 145. The lamp controller 144 may then operate the lamp, in any of its modes of operation, to operate the lamp in response to whether there is motion detected. The command controller 102 may also use signals received from the motion sensor 145 for other purposes such as tracking building occupancy or for security purposes such as identifying undesired occupants and possibly activating an alarm.

The signal received by the lamp controller 145 from the photo sensor 147 indicates the level of luminance in the vicinity of the photo sensor 147. The lighting system 100 may use the information received from the photo sensor 147 to adjust the brightness of a particular lamp 142 to a desired or to a predetermined level of brightness. The brightness of the lamp 142 may then be actively adjusted in response to changes in the luminance of a particular area resulting from changes in the affect of ambient light on the luminance (e.g. the luminance will decrease when the sun goes down and the lamp is responsively brightened to maintain a constant luminance).

The luminance information received from the photo sensor 147 may also be used to indicate whether or not a lamp 142 is operational. For example, in response to a signal received by the lamp controller 144 to turn the lamp 142 "on," the controller 144 may couple the power source 146 to the lamp 142. If the signal received from the photo sensor 147 does not indicate a level of luminance corresponding to the lamp 142 being "on," the lamp controller 144 may transmit a signal indicating a malfunction to the remote controller 143. The remote controller 143 will in turn communicate the malfunction to the command controller 102 to signal an alarm or a message (e.g. an email message, voice recording) to dispatch maintenance personnel to repair the lamp 142.

The lighting system 100 may log the luminance information received from the photo sensors 147. This information may then be used as evidence of the luminance in the vicinity of the photo sensor 147 at a particular time. This may deter assertions that work spaces or public areas are improperly lit. The feedback from the photo sensors may be used to ensure compliance with (Occupational Safety & Health Administration (OSHA) lighting regulations. For example, particular photo sensors may be associated with a corresponding range of acceptable luminance and the system 100 may be programmed to brighten or dim the corresponding lamps to ensure such range is achieved.

The lighting system 100 may track operation of each lamp 142 in the system 100 to determine its predicted remaining lifetime. As described above, the lamp controller 144 may be configured to independently turn the lamp "on" and "off" in response to actuation of the light switch 148. In such instances, the lamp controller 144 may also transmit a signal to the remote controller 143 indicating all status changes of the lamp 142 for tracking purposes. For example, the lamp controller 144 may communicate the operational status (on/off/dim/bright/flash) of the lamp 142 to the remote controller 143 which in turn communicates the status to the command controller 102.

Communication between the remote controller 143, the lamp controller 144, and the sensors 145, 147 may be via wired connection, wireless connection, or a combination of wired and wireless connection. In an exemplary embodiment, the wired communication is via a building's existing power grid. In the embodiment illustrated in FIG. 4, the bi-directional signaling between the remote controller 143 and the lamp controller 144 is via a wireless communications medium as designated by the dashed bi-directional arrow. Although not shown, the photo sensor 147 and/or the motion sensor 145 may wirelessly communicate with the lamp controller 144 rather than via a wired connection. Although the photo sensor 147 and the motion sensor 145 are illustrated as communicating with the lamp controller 144, they may instead be coupled to the remote controller 143 (via wired or wireless connection) and the remote controller 143 may signal the lamp controller 144 to control the lamp 142 accordingly.

In an exemplary embodiment, the lighting control system 100 further includes a temperature sensor coupled to ballasts in the system for determining the health of the ballasts. When a ballast is determined to be operating beyond its specified temperature range, an alarm or message may be generated to signal a maintenance person to schedule replacement or repair of the ballast. The operating temperature may be used to scale a ballast's predicted lifetime in determining when to replace a ballast.

Communication between the remote controller 143, the lamp controller 144, and the sensors 145, 147 may be via wired connection, wireless connection, or a combination of wired and wireless connection. In an exemplary embodiment, the wired communication is via a building's existing power grid. In the embodiment illustrated in FIG. 4, the bi-directional signaling between the remote controller 143 and the lamp controller 144 is via a wireless communications medium as designated by the dashed bi-directional arrow. Although not shown, the photo sensor 147 and/or the motion sensor 145 may wirelessly communicate with the lamp controller 144 rather than via a wired connection. Although the photo sensor 147 and the motion sensor 155 are illustrated as communicating with the lamp controller 144, they may instead be coupled to the remote controller 143 (via wired or wireless connection) and the remote controller 143 may signal the lamp controller 144 to control the lamp 142 accordingly.

Figure 5:
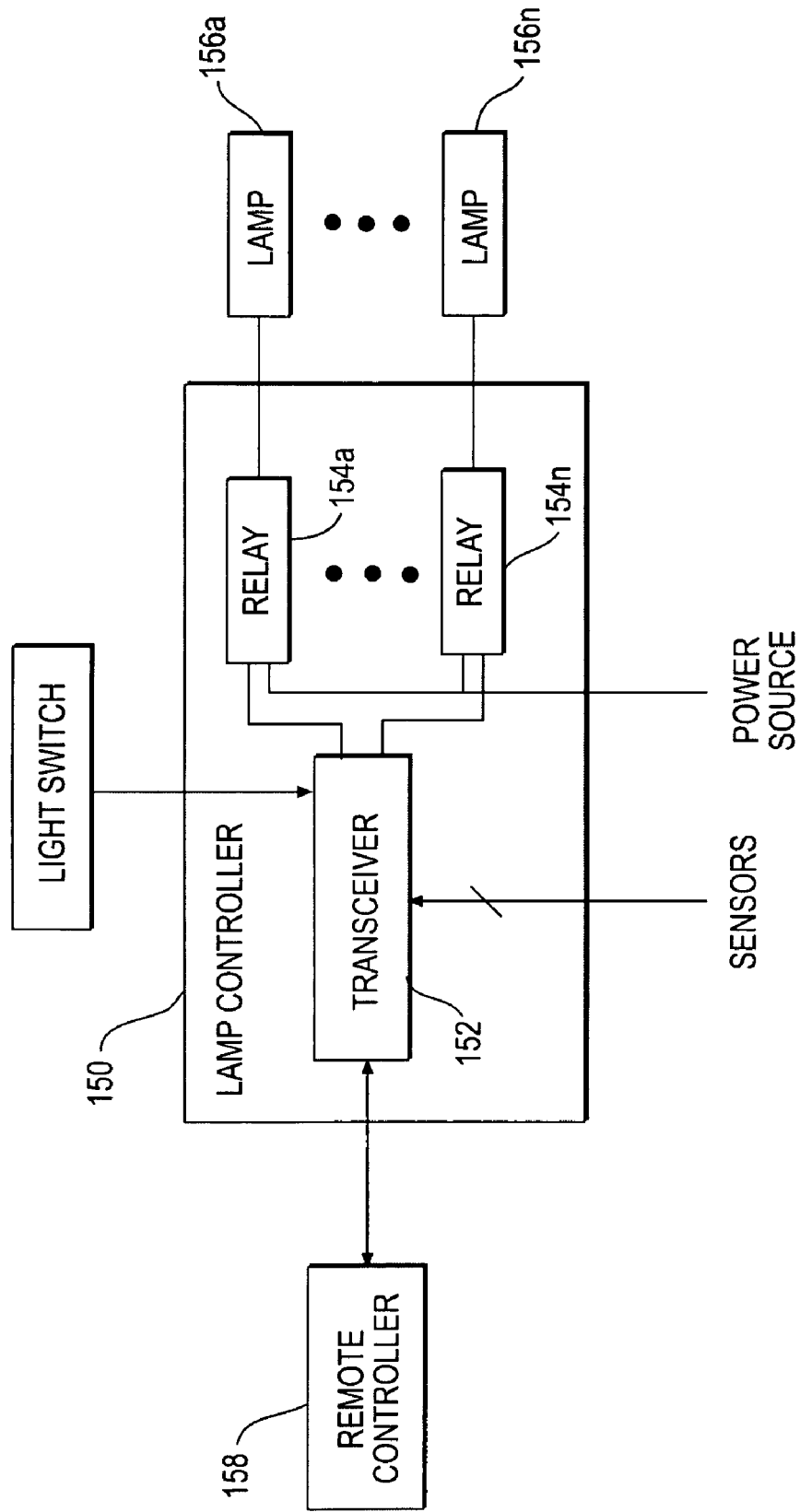
FIG. 5 is a partial block diagram of an exemplary lamp controller according to the present invention.

A partial block diagram of an exemplary lamp controller 150 is shown in FIG. 5. The lamp controller includes a transceiver 152 and one or more relays 154. The lamp controller 150 in this embodiment is not pre-configured to control normal operation of the lamps 156 and instead operates in a dependent mode. All signals received from the sensors or the light switches are received by the lamp controller 150 and then transmitted to the remote controller 158. The remote controller 158 or the command controller 102 then processes the received signal and generates a command signal that it transmits to the transceiver 152, the command signal including information indicating how to control one or more of the lamps 156. The lamp controller 150 then controls operation of the one or more lamps 156 accordingly by sending a signal to the corresponding relays 154. Although the relays and lamps are illustrated as having a one-to-one correspondence, one relay 154 may control one or more lamps 156 and a single signal from the transceiver 152 may be communicated to one or more relays 154. The relays 154 of FIG. 5 may be electro-mechanical, solid state electronic or digital switches (including dimming controls), or may represent ballasts or dimming ballasts for fluorescent lamps.

Figure 6:
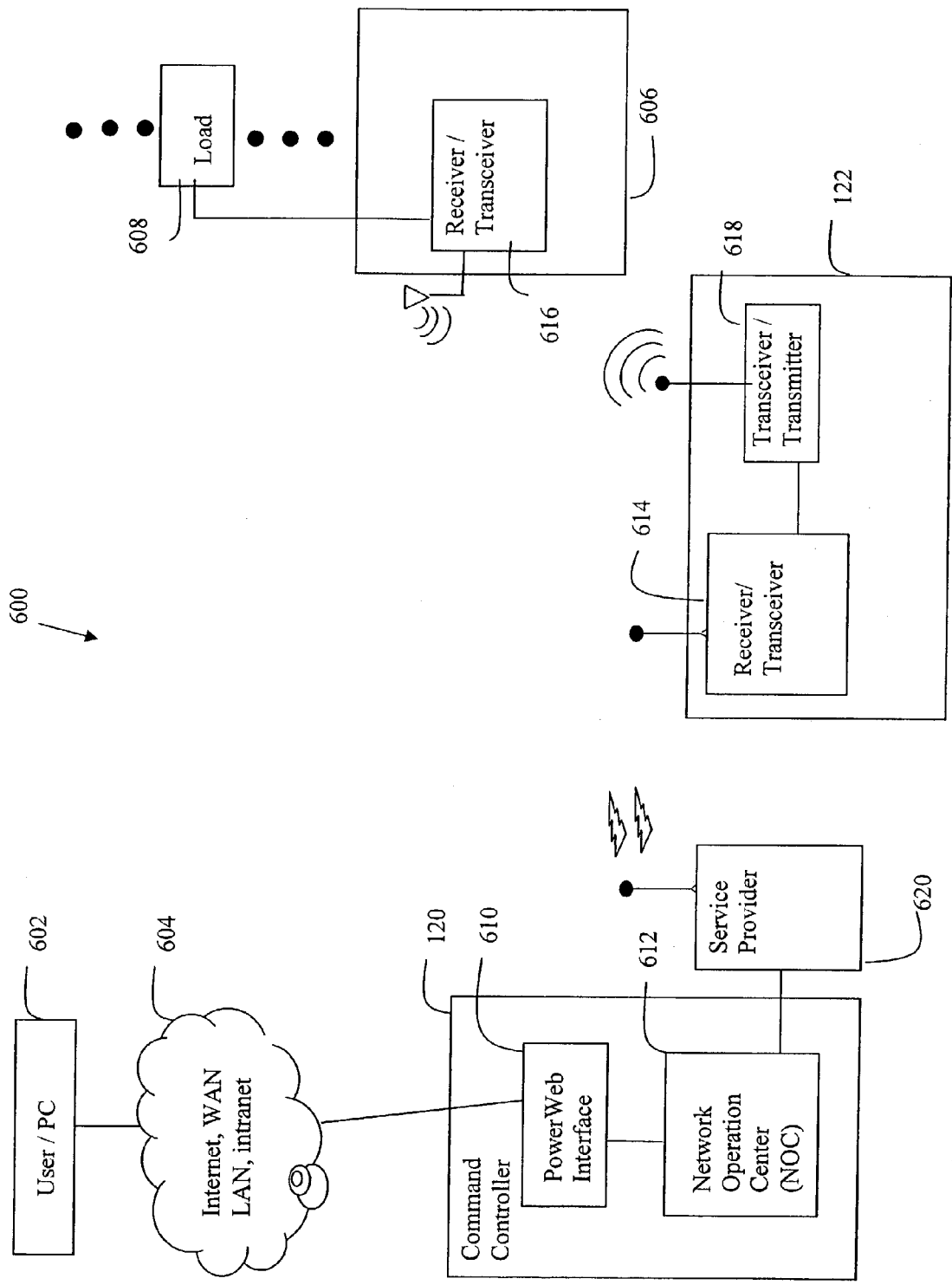
FIG. 6 is a partial block diagram of an exemplary control system according to the present invention.

A partial block diagram of an exemplary control system 600 according to the present invention is shown in FIG. 6. The system 600 combines short range and long range wireless communication networks for communicating command signals from a command controller 120 to control a load 608. The command controller 120 runs a control program that generates a command signal based on input received from a user. The command signal is transmitted to a remote controller 122 via a first wireless network.

The remote controller 122 includes an interface module 614 that receives the command signal via the first wireless network and adapts the command signal for communication over a second wireless network. The remote controller 122 includes another interface module 618 that transmits the adapted command signal over the second wireless network to a load controller 606 which controls a load 608 in response to the adapted command signal.

A user 602 may access the command controller 120 via the internet or other network 604 by using a personal computer, for example. The user may need to be authenticated before being allowed to access the command controller 120. In an exemplary embodiment, a user 602 may access the command controller 120 by logging into a user interface 610 by entering a user name and password. The user interface 610 may be a web site that may either be dedicated to running the control program or may be another commercially available solution such as powerweb.

A user 602 may be provided a level of access to the command controller 120 corresponding to the particular rights associated with the user's user name and password. For example, a user 602 from one company may only be provided access to control loads of one or more locations corresponding to that company and not to loads of another company. Access of a user 602 may also be restricted to loads 608 located at a particular location of a company or particular loads 608 located at a particular location of a company.

Once a user 602 is gains access to the system, the user 602 may select one or more loads 608 to control and may select from one or more control actions to be implemented with respect to the selected loads. In the case of the load 608 being a lamp, the control actions may include turn on, turn off, dim, brighten, or flash actions to be implemented by the load controller 606. After the user 602 has submitted particular loads and corresponding control actions, the command controller 120 converts the user's selection into a command signal.

The command signal includes information identifying the particular load or loads to be controlled and identifying the corresponding control action selected by the user 602. For example, the control signal may have a message structure including fields identifying a company, building, floor, zone, and load or fixture along with the information identifying the particular control action selected by user. The information identifying the building and location may be converted into a wireless address (e.g., a wireless pager or cell phone number) corresponding the particular remote controller 122 to receive the command signal.

The interface 610 transfers the command signal to a network operations center (NOC) 612 that sends the command signal to a service provider 620 (e.g., AT&T) for wireless transmission to a remote controller 122 corresponding to the particular load 608 to be controlled. The wireless communication between the command controller 120 and the remote controller 122 may be via one or more wireless communication technologies, including a GSM (global system for mobile communication), GPRS (general packet radio service), 1XRTT (wireless air interface standard), SMS (short message service) or a pager network. In an exemplary embodiment, the wireless communication between the command controller 120 and the remote controller 122 is in a bandwidth between 900 and 2400 MHz.

The wirelessly transmitted command signal is received by the receiver 614 of a remote controller 122. The remote controller 122 decodes the command signal and adapts the decoded command signal for transmission over a second wireless network to one or more corresponding load controllers 606 for controlling their respective loads 608. The second wireless network may be a radio frequency (RF) or short-range wireless network such as an 802.11 network for communicating with loads 608 that are in a region local to the remote controller 122.

The remote controller 122 may adapt the command signal by transmitting only a portion of the command signal to the particular load controller(s) 606 designated by the information identifying the particular load to be controlled that is needed to control the load 608. For example, the remote controller 122 may strip off any fields identifying the load if the message is sent over the second wireless network is addressed to the particular load controller 606.

Alternatively, if the command signal determines that a control command designated for all loads 608 on a particular floor of a particular building of a particular company, the remote controller 122 may again strip off information identifying the loads and then broadcast the remaining portion of the command signal (i.e., the control command) to all loads on the particular floor. Alternatively, the entire command signal may be transmitted to the designated load controllers which themselves decode the desired control information.

The load controller 606 includes a receiver 616 that receives the control signal (or relevant portion thereof) from the remote controller 122 and converts the signal into a load control signal. In the case of a lamp, for example, the load controller may include an electronic ballast and the receiver 616 may convert the adapted command signal into a 0–10 volt analog input signal to the electronic ballast for controlling a lamp.

Although the exemplary system 600 in FIG. 6 is described above with regard to controlling a load 608, the system 600 may be adapted for bi-directional communication for also receiving information (e.g., status, performance, . . . ) from the load or for receiving information from a monitoring device such as a motion sensor or a photo sensor. The bi-directional communication may be implemented by the command controller 120 and the remote controller 122 each having a transceiver for bi-directionally communicating over the first wireless network and the remote controller 122 and load controller 120 each having a transceiver for bi-directionally communicating over the second wireless network. This way, a monitoring device may provide information such as sensor information to the load controller 120 for transmission over the second wireless network to the remote controller 122 which, in turn, may transmit such information over the first wireless network to the command controller 120. Bi-directional communication also may allow alerts to be transmitted via email or cell phone to a particular user in response to monitored conditions that trigger an alarm. For example, the system may be configured to send a message to a building manager upon a sensor detecting activation of a fire alarm in a building. The message may include information identifying the particular sensor that generated the alarm.

In an exemplary embodiment, the lamp controller is arranged to be compatible with the size of an existing light switch. This provides a simple method for retrofitting an existing building with a lighting system according to the present invention. A light switch may be incorporated into the same device installed in the existing light switch box. The transceiver may be powered by the power source and may communicate via the building's power grid with the remote controller. Alternatively, the lamp controller may include a wireless transceiver for wirelessly communicating with the remote controller.

In an exemplary embodiment, the lamp controller is part of the remote controller and the remote controller is coupled to and controls operation of each lamp.

The command controller 102 controls each remote controller 122 by setting the parameters by which it operates its corresponding light fixtures 120 and lamps. For example, the command controller 102 may include power meters at each location for providing a signal indicating power consumption. The lighting system may be used to maintain power consumption below a certain level such as may be required for a lower contracted power rate. If the actual power consumption is within a predetermined threshold (which may vary depending on time and day), the command controller 102 may signal all remote controllers to reduce power consumption by a certain amount or percentage. In an exemplary embodiment, the lamps of the lighting system may be organized in a hierarchy of importance. When power consumption must be reduced, the lamps lowest on the hierarchy are the first to be dimmed or turned off.

The command controller 102 of a chain of retail stores, for example, may include stored information corresponding to the opening and closing times of each store and the holiday schedule for each store. The command controller 102 may then transmit a signal to the remote controllers to turn the lights on or off depending on whether the store is open or closed.

The operation information for each lamp may be stored by the command controller 102 and then analyzed to determine the optimal type of lamp for a particular location. For example, the command controller can provide statistics of lamp usage over a certain period of time. Such usage information may include the number of on/off cycles, luminance information (histogram over time, average, etc.), duration of on/off periods, etc. This information may then be use to determine the type of lamp best suited for the actual usage characteristics.

The teachings of the present invention are not limited to controlling lighting and may be applied to controlling other electrical devices to reduce power consumption. For example, the system may be coupled to the power lines of office devices such as photocopy machines, coffee machines, printers, etc. Rather than rely on employees to turn off such devices when they leave for the day, the system may automatically turn off such devices upon after closing time of the office or a predetermined time thereafter. Manual switches may be incorporated into the system to override this shut-down mechanism of the control system to ensure office resources are available to employees working beyond regular working yours.

The foregoing describes the invention in terms of embodiments foreseen by the inventors for which an enabling description was available, although insubstantial modifications of the invention, not presently foreseen, may nonetheless represent equivalents thereto.

What is claimed is:

1. A control system for remotely controlling a load comprising:
   a. a command controller running a control program for receiving user input via a user interface, generating a command signal based on the user input, and communicating the command signal to a wireless service provider for communication over a first wireless network; and b. a remote controller wirelessly coupled to said command controller, said remote controller having a first wireless interface module for receiving the command signal from the first wireless network and a second wireless interface module for transmitting at least a portion of the command signal via a second wireless network to the load.

2. The control system according to claim 1 further comprising a load controller having a third wireless interface module for receiving the at least a portion of the command signal from the second wireless network and for controlling the load responsive to the at least a portion of the command signal.

3. The control system according to claim 1 wherein the first, second, and third wireless interface modules comprise transceivers for bi-directional communication between the load controller and the command controller.

4. The control system according to claim 1 wherein the command signal comprises location-identifying information and command-identifying information whereby the remote controller decodes the command signal and directs the command-identifying information to one or more load controllers identified by the location-identifying information.

5. The control system according to claim 1 wherein the first wireless network implements GSM, GPRS, 1XRTT, SMS or a pager network.

6. The control system according to claim 1 wherein the user interface of the command controller authenticates the user before receiving user input and provides the user a level of access determined by the user's authentication information.

7. The control system according to claim 1 wherein the load controller includes an electronic ballast coupled to a lamp and the load controller converts the at least a portion of the command signal into an analog output voltage signal for controlling the output of the electronic ballast.

8. The control system according to claim 2 further comprising a motion sensor for providing a motion signal to the load controller indicating the presence of motion in the vicinity of the motion sensor, wherein said load controller controls the load responsive to the at least a portion of the motion signal.

9. The control system according to claim 2 further comprising a photo sensor for providing a luminance level signal to the load controller indicating the level of luminance in the vicinity of the photo sensor wherein said load controller controls the load responsive to the at least a portion of the luminance level signal.

* * * * *

UNITED STATES PATENT AND TRADEMARK OFFICE
Certificate

Patent No. 6,990,394 B2                                                     Patented: January 24, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Barton A. Pasternak, Elkins Park, PA (US); and Lothar Budike, Jr., Villanova, PA (US).

Signed and Sealed this Sixth Day of September 2011.

*JAYPRAKASH N. GANDHI*
*Supervisory Patent Examiner*
*Art Unit 2835*
*Technology Center 2800*